United States Patent [19]

Barjolle et al.

[11] Patent Number: 5,357,869
[45] Date of Patent: Oct. 25, 1994

[54] DEVICE FOR FACILITATING ACCESS TO A RAIL VEHICLE HAVING EXTENDABLE RAMP ASSEMBLY

[75] Inventors: Jean-Pierre Barjolle, La Rochelle; Patrick Harguindeguy, Angoulins Sur Mer, both of France

[73] Assignee: GEC Alsthom Transport SA, Paris, France

[21] Appl. No.: 83,260

[22] Filed: Jun. 29, 1993

[30] Foreign Application Priority Data

Jul. 10, 1992 [FR] France .................. 92 08611

[51] Int. Cl.⁵ .............................. B61D 47/00
[52] U.S. Cl. ............................... 105/436; 105/425; 280/166; 414/522; 414/537; 414/921
[58] Field of Search .............. 105/425, 426, 431, 432, 105/433, 436; 280/163, 164.1, 166; 414/522, 537, 538, 921

[56] References Cited

U.S. PATENT DOCUMENTS

| | | |
|---|---|---|
| 3,730,361 | 5/1973 | Haynes ................ 105/436 X |
| 3,870,170 | 3/1975 | Noble et al. ............. 414/537 |
| 4,131,209 | 12/1978 | Manning ............... 105/433 X |
| 4,188,889 | 2/1980 | Farrel ................ 280/166 X |
| 4,369,984 | 1/1983 | Hagen ................. 280/166 |
| 4,759,682 | 7/1988 | Hood ................. 105/433 X |
| 4,850,788 | 7/1989 | Dickson ............... 414/537 |
| 5,160,236 | 11/1992 | Redding et al. ........... 414/537 |

FOREIGN PATENT DOCUMENTS

| | | |
|---|---|---|
| 363516 | 10/1929 | Belgium . |
| 3931361 | 10/1990 | Fed. Rep. of Germany . |
| 9001113 | 12/1991 | Netherlands . |
| WO8001266 | 6/1980 | World Int. Prop. O. . |

Primary Examiner—Robert J. Oberleitner
Assistant Examiner—S. Joseph Morano
Attorney, Agent, or Firm—Sughrue, Mion, Zinn, Macpeak & Seas

[57] ABSTRACT

Access to a rail vehicle is effected by a board that is movable between a retracted position in which it is housed beneath the top face of the floor of the vehicle and an extended position in which it constitutes an access ramp between a platform and an entrance doorsill of the vehicle. The device includes an actuator for driving the board and a stop terminating translation of the board in its extended position. The actuator is disposed in the plane of the board. The device also tilts the board after stopping the board's movement in translation so that the outside end of the board rests on the platform and so that the board co-operates with the entrance doorsill to provide a continuous surface without any offset. The entrance doorsill remains stationary.

2 Claims, 4 Drawing Sheets

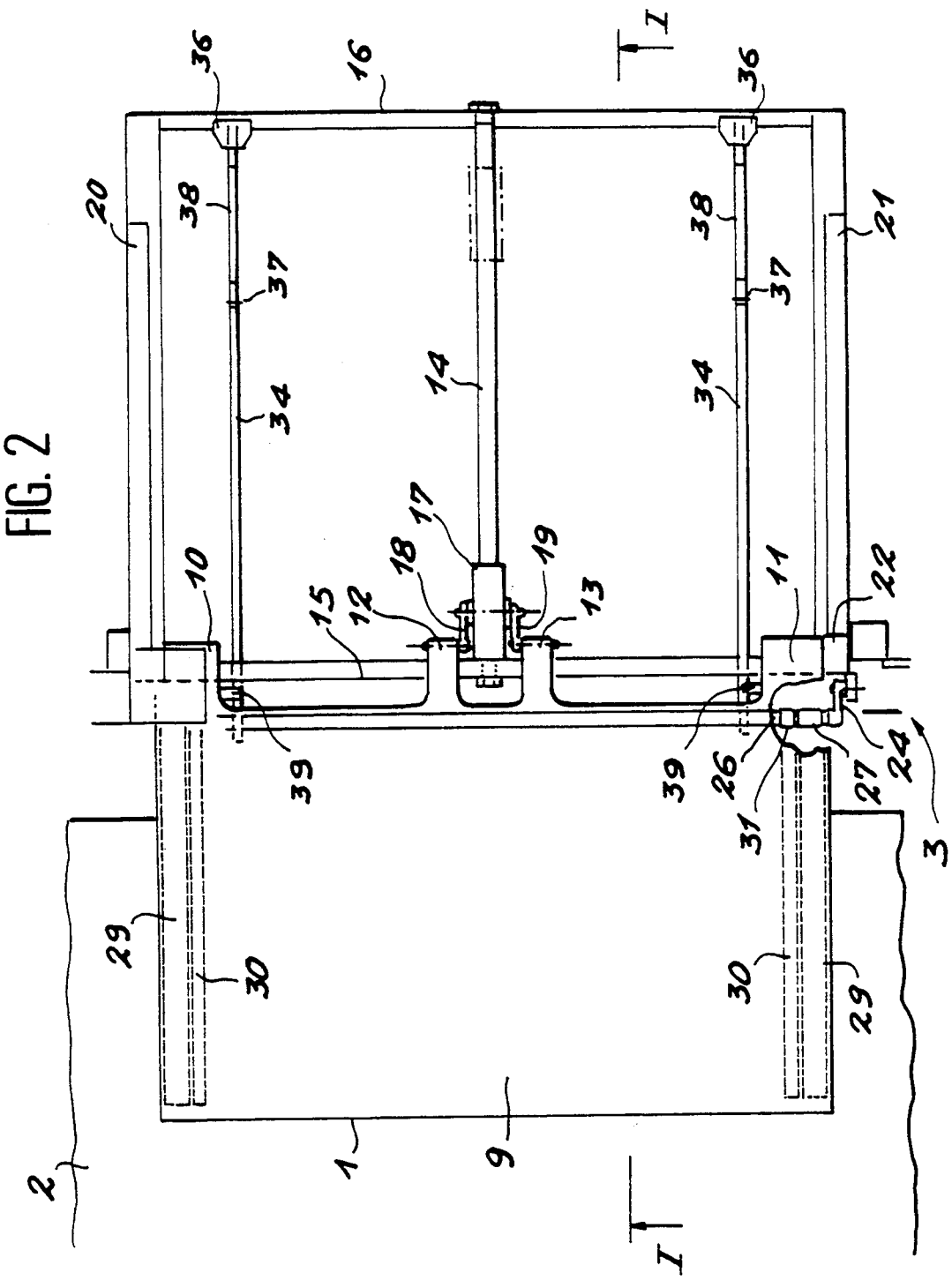

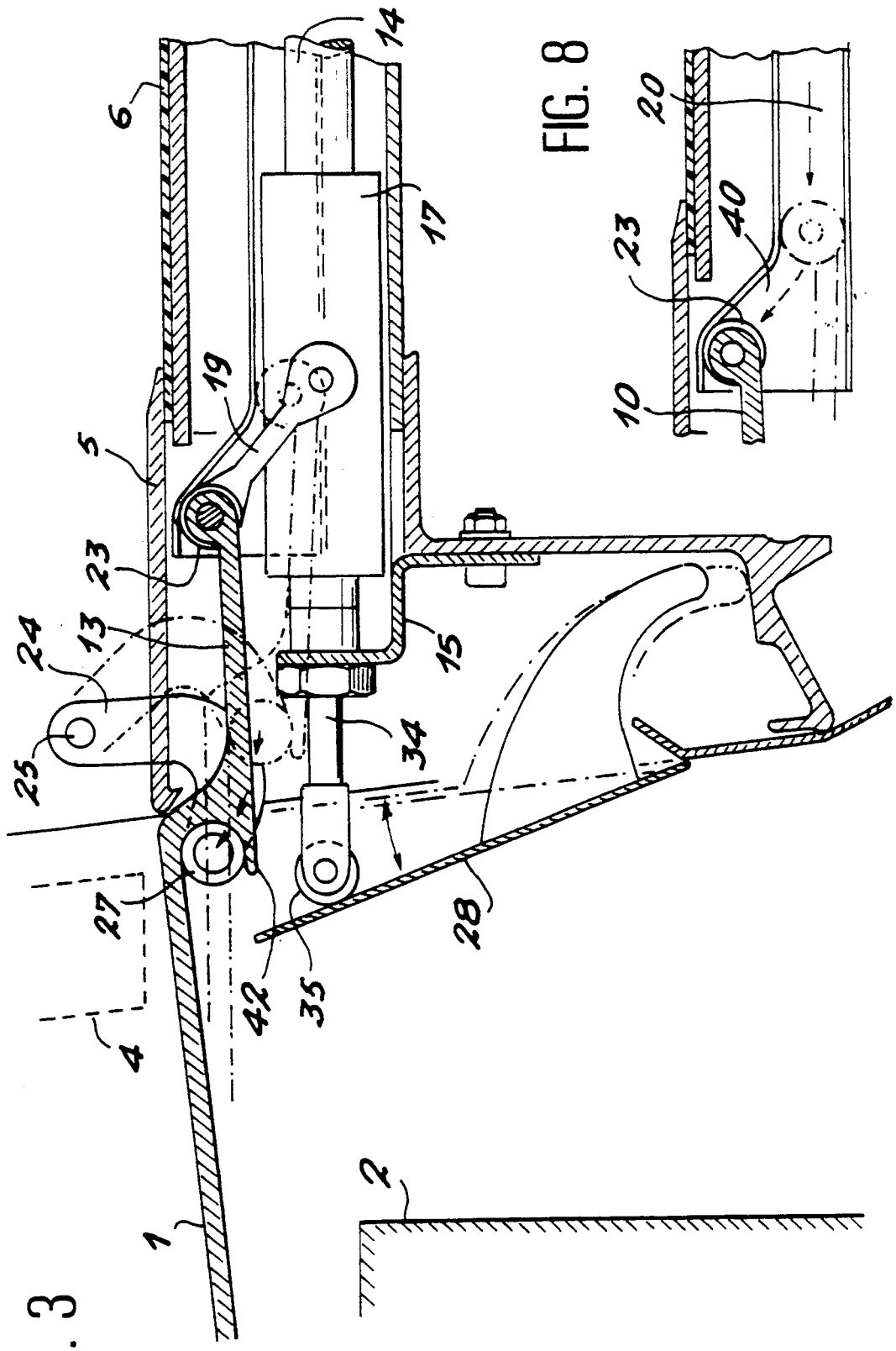

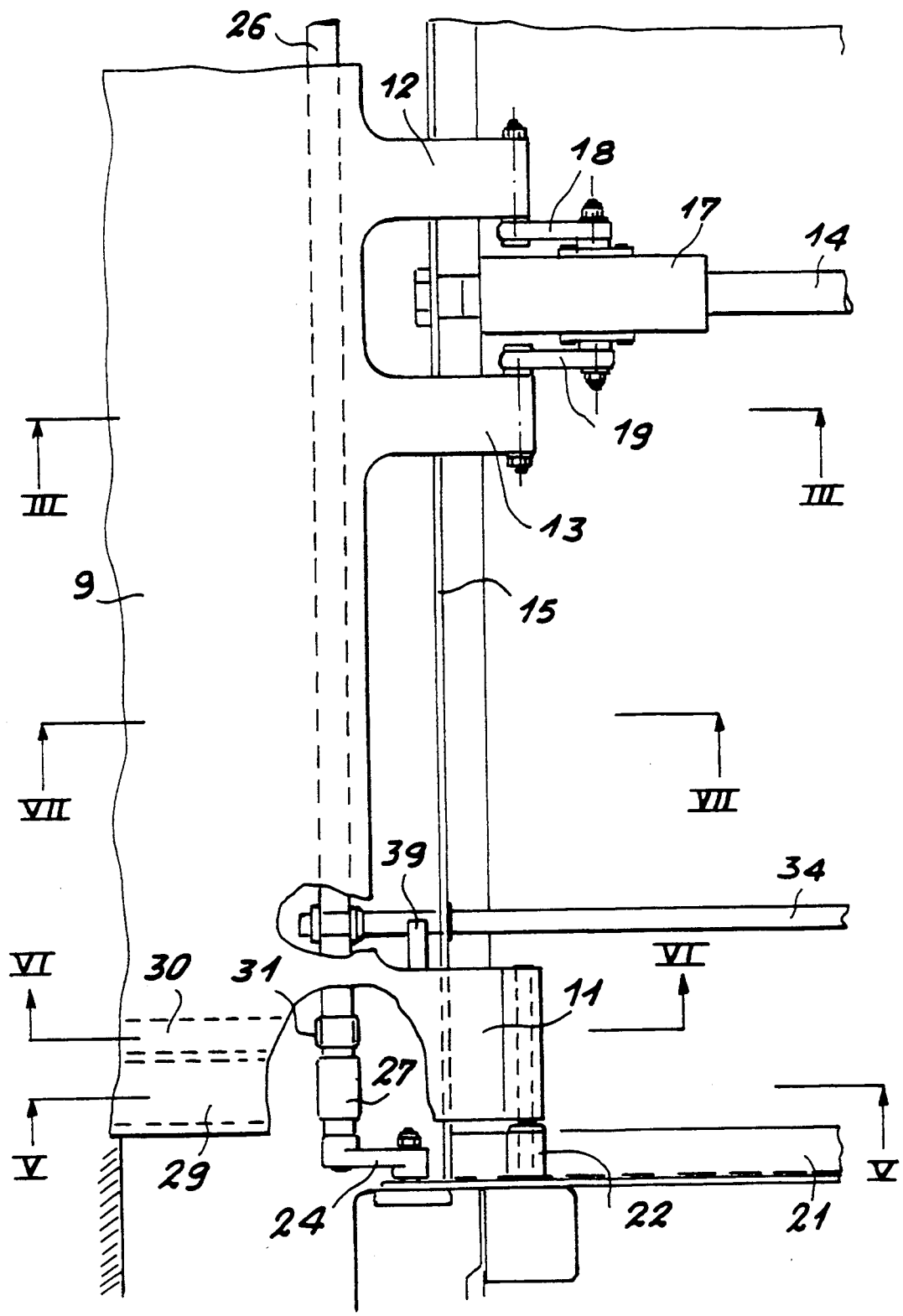

DEVICE FOR FACILITATING ACCESS TO A RAIL VEHICLE HAVING EXTENDABLE RAMP ASSEMBLY

The present invention relates to a device for facilitating access to a rail vehicle while stopped at a station, in particular for people having difficulty with mobility, handicapped people in wheelchairs, or people travelling with baggage on wheels.

BACKGROUND OF THE INVENTION

Document FR-A-2 587 667 describes a device giving easy access to rail vehicles while stopped at a station and including a doorsill and a board forming a loading ramp. The doorsill and the board are hinged between two extreme positions: a folded position in which the vehicle can run, and an unfolded position giving access to the vehicle. In the folded position, the doorsill is in a horizontal position and constitutes a portion of the floor of the vehicle. In the unfolded position, the doorsill and the board are inclined, with the board resting against the platform.

Given its structure and function, that device, when in the unfolded position, has a slope of about 20%. Such a high figure is no longer acceptable, and railway operators are now tending to set a maximum figure of 10%. In addition, the housing for the device in the vehicle occupies a large amount of vertical space that requires a cutout to be formed in the vehicle frame. This reduces the strength of the frame and consequently it reduces passenger safety. Finally, the device includes a hinged doorsill which, while the vehicle is running, constitutes a source of draughts and gives rise to problems of sealing. As a result, the device cannot be used in high speed trains whose access doors are fitted with inflatable gaskets for combatting phenomena due to pressure waves.

A device of the same kind is described in FR-A-35 2 416 136. That device comprises an access ramp to the vehicle and capable of moving between a retracted position in which its outer portion constitutes a conventional type of step, and an extended position enabling handicapped people to gain access to the vehicle. The device also includes members for controlling the extending and retracting movements of the access ramp. That device suffers from the same drawbacks as those specified for document FR-A-2 587 667.

OBJECT AND SUMMARY OF THE INVENTION

The access device of the invention serves to mitigate the above drawbacks. In the unfolded position it has a slope of less than 10%. It occupies a small amount of vertical space, thus making it possible to house it in the floor of the vehicle without making a cutout in the frame of the vehicle. It does not include a hinged doorsill, thereby making it suitable for use in high speed trains.

The present invention therefore provides a device for facilitating access to a rail vehicle, the device comprising a board that is movable between a retracted position in which it is housed beneath the top face of the floor of the vehicle and an extended position in which it constitutes an access ramp between a platform and an entrance doorsill of the vehicle, the device including drive means for driving the board and means for stopping translation of the board in its extended position, wherein the drive means are disposed in the plane of the board, the device including means for tilting the board about means for stopping the board's movement in translation so that the outside end of the board rests on the platform and so that the board cooperates with the entrance doorsill to provide a continuous surface without any offset, the entrance doorsill remaining stationary.

Advantageously, the drive means comprise a rodless actuator having a slide that is driven by magnetic coupling.

The drive means may be connected to the board by links.

The means for stopping translation movement of the board may comprise a rod disposed transversely relative to the board, the board being fitted with retaining means that engage the rod to limit the stroke of the board in the extended position.

The board may comprise a plate constituting said access ramp and a portion situated in a plane different from that of the plate, the connection between the plate and said portion forming a fork to constitute said retaining means.

BRIEF DESCRIPTION OF THE DRAWINGS

The invention will be better understood and other advantages and features will appear on reading the following description given by way of non-limiting example and made with reference to the accompanying drawings, in which:

FIG. 2 is a plan view corresponding to FIG. 1 with a portion of the rail vehicle removed to show the drive members;

FIG. 3 is a view of a detail of FIG. 1 on a larger scale;

FIG. 4 is a view of a detail of FIG. 2 on a larger scale;

FIG. 8 shows a detail of FIG. 3.

MORE DETAILED DESCRIPTION

Figure 1:
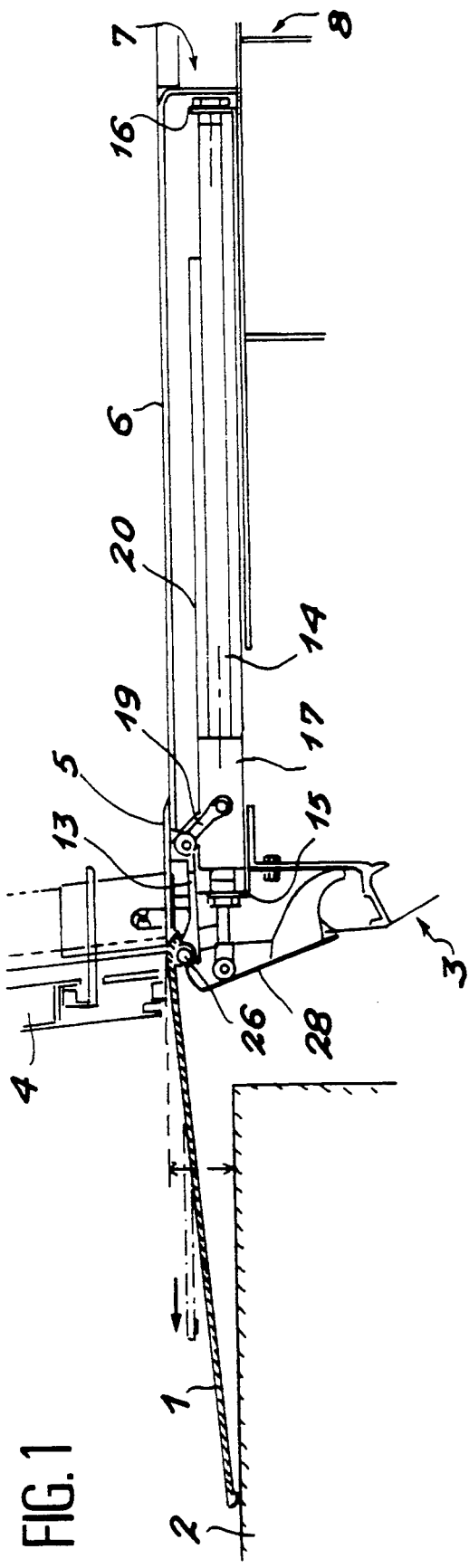
FIG. 1 is a side view of the board of the access device of the invention in position on a station platform.

FIGS. 1 and 2 show the board 1 in its fully deployed state, so that its outer end rests on the platform 2. It gives access to the inside of the rail vehicle 3 whose door 4 can be seen in the open position. As can be seen in FIG. 1, the board co-operates with the entrance doorsill 5 of the vehicle to form a continuous surface without any step or offset. The doorsill 5 remains stationary and provides continuity with the top face 6 of the floor 7 of the vehicle. The floor is supported on the frame 8 which does not include a cutout, since the device of the invention is housed fully within the thickness of the floor.

The major portion of the board 1 is constituted by a rectangular plate 9 whose end adjacent to the doorsill 5, when the board is fully deployed, is slightly curved and is extended by lateral elements 10 and 11 and by central elements 12 and 13. These lateral and central elements are situated in a plane that is parallel to and below that of the board 1. The lateral elements 10 and 11 serve to guide the board. The central elements 12 and 13 serve to drive it.

The board may be driven by means of a linear pneumatic drive actuator without a piston rod and making use of magnetic coupling, e.g. of the type sold by the FESTO Company.

In FIGS. 1 and 2, there can be seen the drive actuator 14 which is fixed at its ends to brackets 5 and 16 parallel to the main axis of the vehicle. The axis of the actuator 14 is thus perpendicular to the entrance to the vehicle.

A slider 17 is capable of sliding along the actuator 14 under magnetic coupling. The central elements 12 and 13 of the board 1 are disposed on either side of the slider 17. Links 18 and 19 connect these central elements to the slider.

The board is guided for deployment and retraction purposes along slideways 20 and 21 disposed beneath the floor of the vehicle. These slideways are open towards the inside of the device to allow wheels 22 (see FIG. 2) and 23 (see FIG. 3) to run therealong, which wheels are carried on the outsides of the lateral elements 10 and 11.

The device also includes two rocking arms on either side of the board and mounted on the uprights of the door opening. These rocking arms can be seen more clearly in FIG. 3 which is an enlarged view of FIG. 1. They are rotatable about the axis 25 about which they are fixed to the door uprights. The rocking arms are connected together by a rod 26 supporting load-carrying wheels 27 at its ends. While it is being deployed, the board is thus guided horizontally by the slideways 20 and 21 and bears continuously on the load-carrying wheels 27.

The door of the vehicle and the board may operate simultaneously, in alternation, or independently. However, in order to minimize time lost in a station, it is preferable for the door and board displacement stages to be related to each other. On arrival in a station, the board is extended and then the vehicle door is opened, with the door providing access only once the board has been placed on the platform. On leaving a station, the door is closed initially and then once the door prevents access, the board begins to be retracted. Thereafter both the door and the board finish off their respective strokes.

The board is thus movable between two extreme positions: a horizontal position during vehicle travel; and an inclined position where it constitutes a continuous ramp giving access to the vehicle.

A protective flap 28 completely masks the board and its guide and drive mechanism while the vehicle is moving.

When the board is extended, because of recesses in the slideways, it retains the possibility of oscillating relative to the vehicle body. This makes it possible to avoid hurting passengers whose feet happen to be at the edge of the platform. It also makes it possible for the body to move down under the effect of passengers boarding without interfering with the guidance and drive mechanism. Furthermore, the access device is reversible thus making it possible, in the event of a breakdown, to retract the board by hand after pneumatically isolating the actuator control motor.

Figure 5:
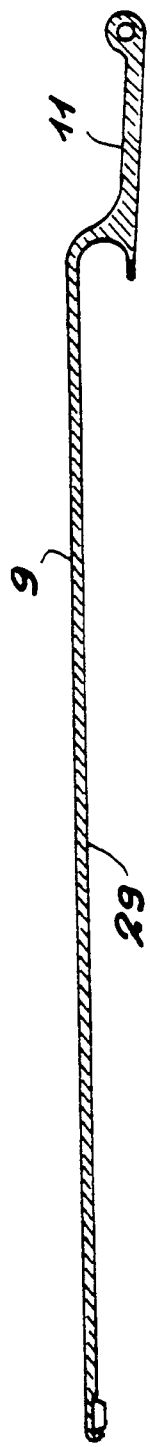
FIGS. 5, 6, and 7 are side views showing the board of the device of the invention.
Figure 6:
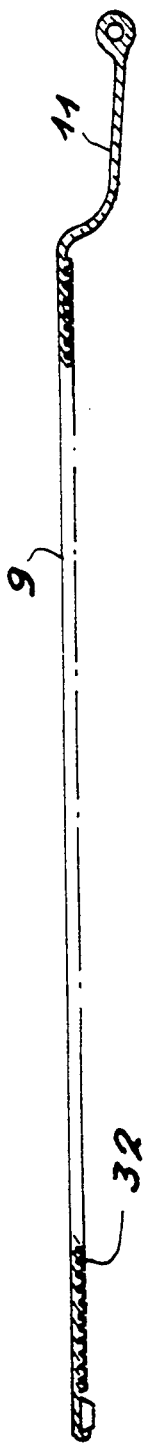

The lateral portions of the board include specialized zones that can be seen in FIGS. 2 and 4. They comprise load-carrying tracks 29 and stabilizing tracks 30 formed beneath the plate 9 of the board. The load-carrying tracks 29 allow the board to run over the load-carrying wheels 27. They are constituted by a plane surface as can be seen in FIG. 5 which is a section through the board on axis V—V of FIG. 4. The tracks 30 and gear wheels 31 carried by the rod 26 serve to stabilize the board during its deployment and retraction movements. They are constituted by racks 32 that mesh with the gear wheels 31, as can be seen in FIG. 6 which is a section through the board on line VI—VI of FIG. 4.

Figure 7:
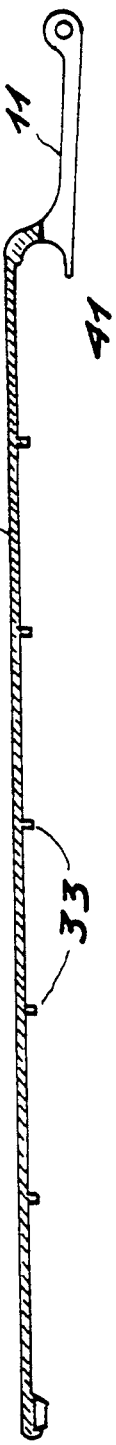

The central portion of the board includes stiffeners 33 as shown in FIG. 7 which is a section through the board on line VII—VII of FIG. 4.

The device operates as follows. On stopping in a station, the rodless actuator 14 is energized to push the board 1 out from the vehicle by means of the slider 17 and the links 18 and 19. The board then moves horizontally as shown by dashed lines in FIG. 1. The protective flap 28 opens to allow the board to move past. The flap 28 is opened by push rods 34 (see FIGS. 2, 3, and 4) terminated by wheels 35. The push rods 34 slide in holes formed through the bracket 15 (adjacent to the vehicle door) and through supports 36 (on the inside of the vehicle). The corresponding end of each rod 34 includes a retaining element for retaining the rod. The stroke possible for these rods is constituted by the distance between their rear ends and the bracket 16. The rods have respective collars 37 and a spring 38 is disposed between each collar and the support 36 corresponding to the rod. In this way, the rods are subjected to thrust that tends to cause the flap to open. In the folded position, abutments 39 secured to the board act on the spring 38 and cause the rods 34 to be withdrawn. A spring (not shown) then causes the flap 28 to close. At the beginning of opening, the abutments 39 quickly release the springs 38 and the rods 34 force the flap 28 to open.

The board continues to move horizontally until the wheels 22 and 23 reach the vertical recesses that terminate the slideways 20 and 21. FIG. 8 which is a detailed view of FIG. 3 shows this stage in deployment of the board. In this figure, the actuator, the slider, the links, and the central elements of the board are omitted, thereby making it possible to see the wheel 23 carried by the lateral element 10 in the vertical recess 40 of the slideway 20. At this moment, the board slopes under the effect of gravity. The vehicle door opens while the drive mechanism continues to push the board outwards.

The forks of the board then push the rod 26 so as to rock the rocking arms 24. The rod 26 and the rocking arms 24 constitute members for stopping the board's movement in translation and for allowing it to tilt so that the outside end of the board rests on the platform. It may also be observed that the board runs continuously without any offset into the entrance doorsill 5.

FIGS. 1, 3, 5, and 7 show that the forks of the board are constituted by the connection zone between the plate 9 and the lateral and central elements 10, 11, 12, and 13, said lateral essential elements extending the board forwards in the form of fingers that are parallel to the plate.

FIG. 3 shows the finger 42 corresponding to the central element 13 and FIG. 7 shows the finger 41 corresponding to the lateral element 11.

Before departure of the vehicle, the door closes and the actuator is energized in the opposite direction, thereby causing the board to be retracted into the vehicle.

The device of the invention makes it possible to reduce embarkation time compared with prior art ramp type systems since the board is extended and retracted, in part, while the door is being operated. It will be observed that this device includes a minimum number of moving parts and that they are of small mass, thereby enabling energy consumption to be reduced. This also leads to better safety for people and for equipment, to increased reliability, to reduced wear and maintenance, and to reduced operating costs. When working under fault conditions, it is easy to operate the device manually. The modular drawer-type design of the device makes it easy to replace it as a whole. The door can be operated and access obtained to the vehicle even when the board is out of operation.

By installing the device of the invention within the thickness of the floor, a significant saving in space beneath the frame is obtained thus providing better distribution of equipment masses beneath the frame. Reduced bulk and modular structure make it possible to adapt the device to existing rolling stock.

The use of a rodless actuator reduces the bulk of the device, for an actuator of similar length and stroke. The absence of a rod reduces moving mass. The actuator reaches the end of its stroke without making contact, because of magnetic detection. This rodless actuator is easily adapted to the lengths and strokes applicable in each case. The forces provided for extending and retracting the board are equivalent. There is no risk of leakage.

We claim:

1. A device for facilitating access to a rail vehicle having a floor and an entrance doorsill, said device comprising:
   a board;
   means for mounting said board within said rail vehicle for movement between a retracted position in which it is housed beneath a top face of the floor of the vehicle and an extended position in which it constitutes an access ramp between a platform and said entrance doorsill;
   drive means for driving the board;
   stop means for stopping the translation of the board in its extended position, said drive means for driving the board being disposed in the plane of the board; and
   means for tilting the board downwardly about said stop means, whereby an outside end of the board rests on the platform with the board cooperating with the entrance doorsill to provide a continuous surface without any offset with the entrance doorsill maintained stationary;
   wherein said stop means for stopping the board's movement in translation comprises retaining means, engaging the board to limit the stroke of the board in its extended position, and a rod disposed transversely relative to the board, and said board is fitted with said retaining means for engaging said rod;
   wherein the board comprises a plate constituting said access ramp and a portion situated in a plane different from that of the plate, the connection between the plate and said portion forming a fork to constitute said retaining means.

2. A device for facilitating access to a rail vehicle having a floor and an entrance doorsill, said device comprising:
   a board;
   means for mounting said board within said rail vehicle for movement between a retracted position in which it is housed beneath a top face of the floor of the vehicle and an extended position in which it constitutes an access ramp between a platform and said entrance doorsill;
   drive means for driving the board;
   stop means for stopping the translation of the board in its extended position, said drive means for driving the board being disposed in the plane of the board; and
   means for tilting the board downwardly about said stop means, whereby an outside end of the board rests on the platform with the board cooperating with the entrance doorsill to provide a continuous surface without any offset with the entrance doorsill maintained stationary;
   wherein said stop means for stopping the board's movement in translation comprises retaining means, engaging the board to limit the stroke of the board in its extended position, and a rod disposed transversely relative to the board, and said board is fitted with said retaining means for engaging said rod;
   wherein said rod is connected to first ends of rocking arms whose second ends are rotatable about points that are fixed relative to the vehicle.

* * * * *